United States Patent
Tsai et al.

(10) Patent No.: US 9,201,462 B2
(45) Date of Patent: Dec. 1, 2015

(54) PORTABLE COMPUTER

(71) Applicant: Quanta Computer, Inc., Taoyuan Shien (TW)

(72) Inventors: Wen-Hung Tsai, Taoyuan Shien (TW); Wan-Li Sung, Taoyuan Shien (TW); Mao-Sung Lin, Taoyuan Shien (TW); Chien-Fa Huang, Taoyuan Shien (TW); Mao-Chen Hsiao, New Taipei (TW); Chih-Hsuan Chen, Taipei (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 31 days.

(21) Appl. No.: 14/044,805

(22) Filed: Oct. 2, 2013

(65) Prior Publication Data

US 2014/0218301 A1    Aug. 7, 2014

(30) Foreign Application Priority Data

Feb. 7, 2013   (TW) .............................. 102104899 A

(51) Int. Cl.
  *G06F 3/02*   (2006.01)
  *G06F 1/16*   (2006.01)
  *G06F 3/038*  (2013.01)

(52) U.S. Cl.
  CPC .............. *G06F 1/1662* (2013.01); *G06F 1/169* (2013.01); *G06F 3/0213* (2013.01); *G06F 3/038* (2013.01)

(58) Field of Classification Search
  CPC ........................................................ G06F 3/02
  USPC ............ 345/168, 169, 171, 172–178; 178/18, 178/19
  See application file for complete search history.

(56) References Cited

U.S. PATENT DOCUMENTS

| | | | |
|---|---|---|---|
| 6,574,095 B2 * | 6/2003 | Suzuki | 361/679.08 |
| 2003/0137497 A1 * | 7/2003 | Kojo et al. | 345/173 |
| 2010/0026626 A1 * | 2/2010 | Macfarlane | 345/160 |
| 2011/0199309 A1 * | 8/2011 | Chuang | 345/168 |
| 2011/0227834 A1 | 9/2011 | Yang et al. | |
| 2013/0314345 A1 * | 11/2013 | Kao et al. | 345/173 |

FOREIGN PATENT DOCUMENTS

| | | | | |
|---|---|---|---|---|
| CH | 201649931 | * | 6/2012 | ........... G09G 5/00 |
| TW | 200939086 A | | 9/2009 | |
| TW | 201128451 A | | 8/2011 | |
| TW | M437490 | | 9/2012 | |

* cited by examiner

*Primary Examiner* — Olga Merkoulova
(74) *Attorney, Agent, or Firm* — Sawyer Law Group, P.C.

(57) ABSTRACT

A portable computer includes a computer body and a keyboard. The keyboard includes a plurality of keys and a space bar. The space bar includes a base frame, a touch pad, an elastic element and a key switch. The touch pad is elevatably disposed on the base frame, and one surface of the touch pad can provide a cursor of the portable computer. The elastic element is disposed between the base frame and the touch pad, and elastically supports the touch pad. The key switch is disposed on the other surface of the touch pad. When one of the keys is clicked, the computer body disables the touch pad and enables the key switch.

9 Claims, 5 Drawing Sheets

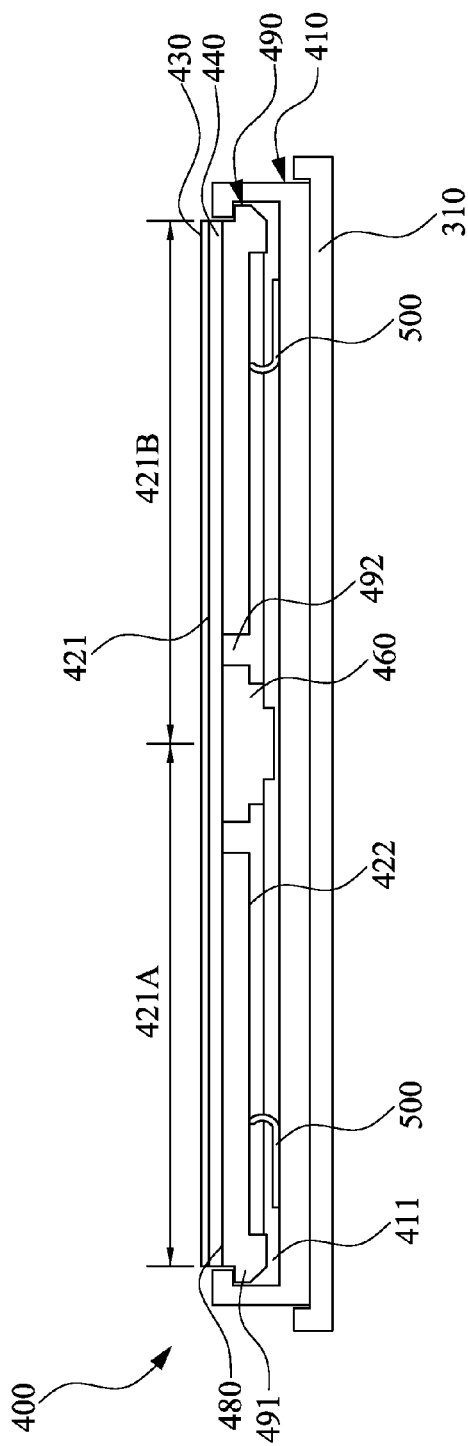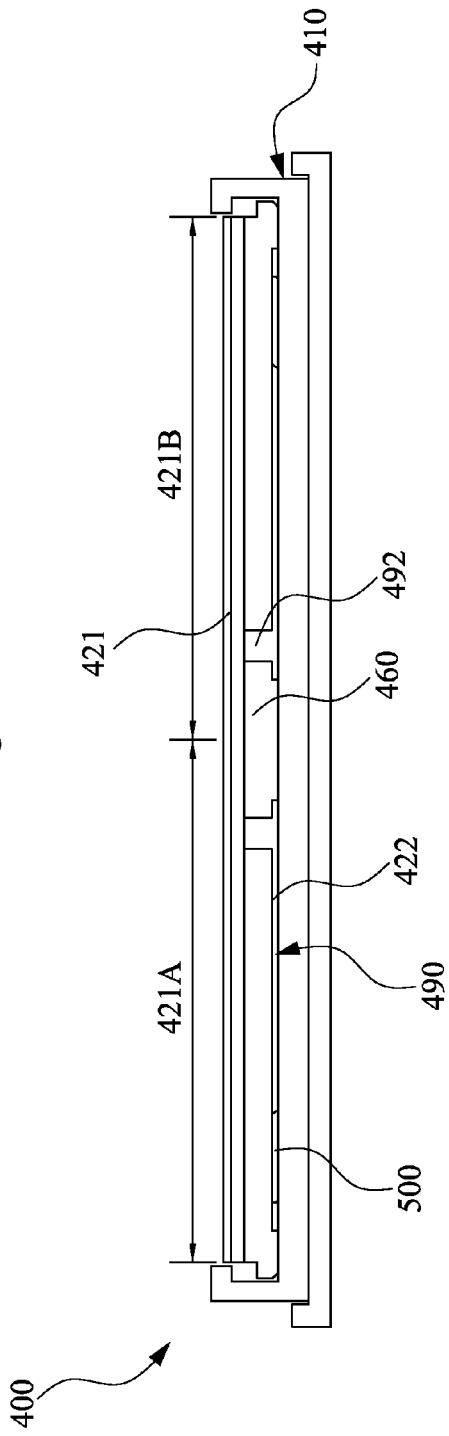
Fig. 3
Fig. 4

PORTABLE COMPUTER

CROSS-REFERENCE TO RELATED APPLICATIONS

This application claims priority to Taiwan Application Serial Number 102104899, filed Feb. 7, 2013, which are herein incorporated by reference.

FIELD OF THE INVENTION

The present disclosure relates to a portable computer. More particularly, the disclosure relates to a portable computer having a touch pad capable of linearly ascending and descending.

BACKGROUND

Conventionally, a notebook computer has an operation surface with a keyboard, and often with a touch pad. The touch pad is disposed at one side of the keyboard which is relatively closer to the user, so that the user can conveniently use the touch pad to control a cursor of the screen, and use the keyboard for data-inputting.

However, due to the requirement of size or arrangement in design of notebook computers, the keyboard of the notebook computer may be downsized, and the touch pad may be relocated or cancelled, in a smaller size. Alternatively, the area on the operation surface for resting the user's wrist may be reduced. In this regard, the user may has to learn a new way of operating the notebook computer which is inconvenient for the user.

Accordingly, it is import to provide a novel portable computer which can meet the requirement in design and also allow the keyboard and the touch pad both to be provided, so as to shorten the time of learning and getting used to the new way of operating the computer.

SUMMARY

According to one embodiment of the present disclosure, the present disclosure discloses a portable computer in which a touch pad and a space bar are integrated together for meeting the designing requirement and still having both the space bar and the touch pad so as to shorten the time required by the user to learn the new operation technique.

According to one embodiment of the present disclosure, the portable computer includes a computer body and a keyboard. The keyboard includes a plurality of keys and a space bar. The space bar includes a base frame, a touch pad, at least one elastic element and a key switch. The touch pad is linearly and elevatably disposed in the base frame, the touch pad comprises a first surface and a second surface opposite to the first surface thereof. The touch pad generates a cursor displacing signal corresponding to the location where the first surface is touched. The elastic element is disposed between the base frame and the second surface of the touch pad, and elastically supports the touch pad. The first key switch is disposed on the second surface. When at least one of the keys is clicked, the computer body disables the touch pad and enables the first key switch.

According to one alternative of this embodiment, the keyboard further comprises a support frame. The support frame supports the keys and the space bar.

According to one alternative of this embodiment, the space bar further includes a protective film covered on the first surface of the touch pad.

According to one alternative of this embodiment, the computer body further comprises a single control chip. The single control chip is disposed in the keyboard and electrically connected to the first key switch and the touch pad.

According to one alternative of this embodiment, when the touch pad is pressed downwardly to trigger the first key switch, the first key switch generates a key code of the space bar of the keyboard.

According to another alternative of this embodiment, the computer body further comprises a timer. The timer notifies the computer body after a certain period of time is exceeded, thus, when anyone of the keys is not clicked within the certain period of time, the computer body enables the touch pad. In addition, when anyone of the keys is not clicked within the certain period of time, the computer body further disables the first key switch.

According to one alternative of this embodiment, the first surface of the touch pad is divided into a first portion and a second portion which are symmetrically arranged abreast. Thus, when the touch pad is enabled, and after the touch pad is pressed downwardly to trigger the first key switch, the computer body enables the first key switch to generate a key code of a left mouse key or a right mouse key with respect to the first portion or the second portion of the first surface of the touch pad being touched.

According to one alternative of this embodiment, the second surface of the touch pad is divided into a third portion and a fourth portion which are symmetrically arranged abreast. The first key switch is disposed on the third portion of the second surface. The space bar further includes a second key switch. The second key switch is disposed on the fourth portion of the second surface. when the touch pad is pressed downwardly to trigger at least one of the first key switch and the second key switch, the triggered one of the first key switch and the second key switch generates a key code of the space bar.

According to one alternative of this embodiment, the computer body further includes a timer. The timer notifies the computer body after a certain period of time is exceeded. Thus, when anyone of the keys is not clicked within the certain period of time, the computer body enables the touch pad, and the computer body enables the first key switch to generate a key code of a left mouse key after being triggered, and the second key switch to generate a key code of a right mouse key after being triggered.

Based on what has been disclosed above, the portable computer provided by the present disclosure integrates the touch pad and the space bar as one, the operation surface where the keyboard of the portable computer being disposed can be larger, so the operation surface can be relatively reduced or other components are allowed to be installed due to be the saved space, so the time required for learning a new operation technique for the user can be decreased.

BRIEF DESCRIPTION OF THE DRAWINGS

The present disclosure will be apparent to those skilled in the art by reading the following detailed description of a preferred embodiment thereof, with reference to the attached drawings, in which:

FIG. 3 is a cross sectional view taken alone A-A showing the space bar shown in FIG. 1 not being clicked;

FIG. 4 is a cross sectional view taken alone A-A showing the space bar shown in FIG. 1 being clicked;

DETAILED DESCRIPTION

The spirit of the disclosure will be described clearly through the drawings and the detailed description as follows. Any of those of ordinary skills in the art can make modifications and variations from the technology taught in the disclosure after understanding the embodiments of the disclosure, without departing from the sprite and scope of the disclosure.

The present disclosure provides a portable computer. A keyboard installed on the portable computer includes a plurality of keys and a space bar. The space bar is reciprocatably and elevatably disposed on the keyboard so that the space bar can linearly ascend or descend on the keyboard. One outer surface of the space bar provides the control of a cursor to be displaced. One inner surface of the space bar is installed with a key switch. When any of the keys is clicked, the key switch is set to be the space bar of the keyboard; otherwise, when any of the keys installed on the keyboard is not clicked, the outer surface of the space bar provides the control to the cursor to be displaced.

Figure 1:
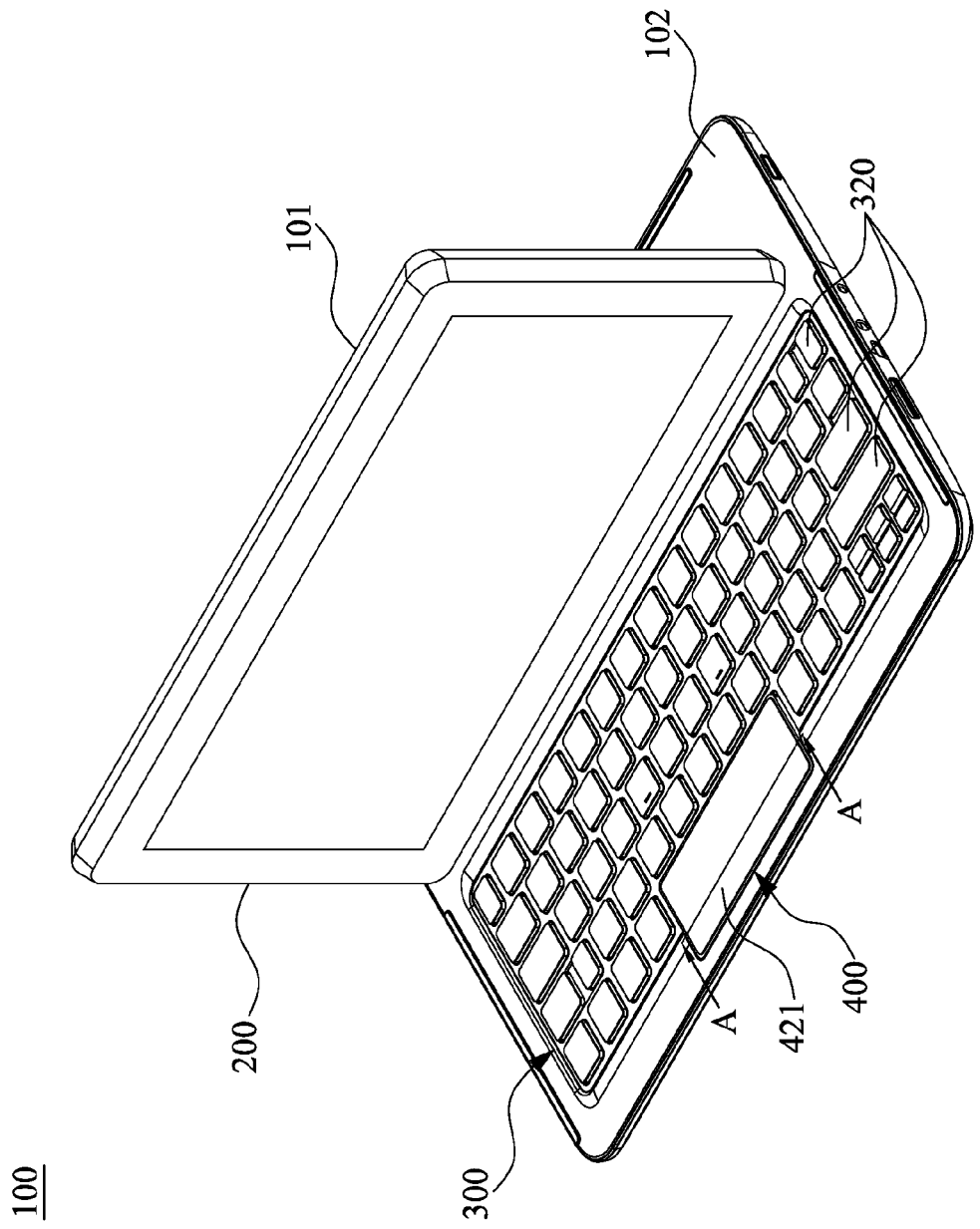
FIG. 1 is a schematic view showing an unfolded status of the portable computer according to one embodiment of the present disclosure.
Figure 2:
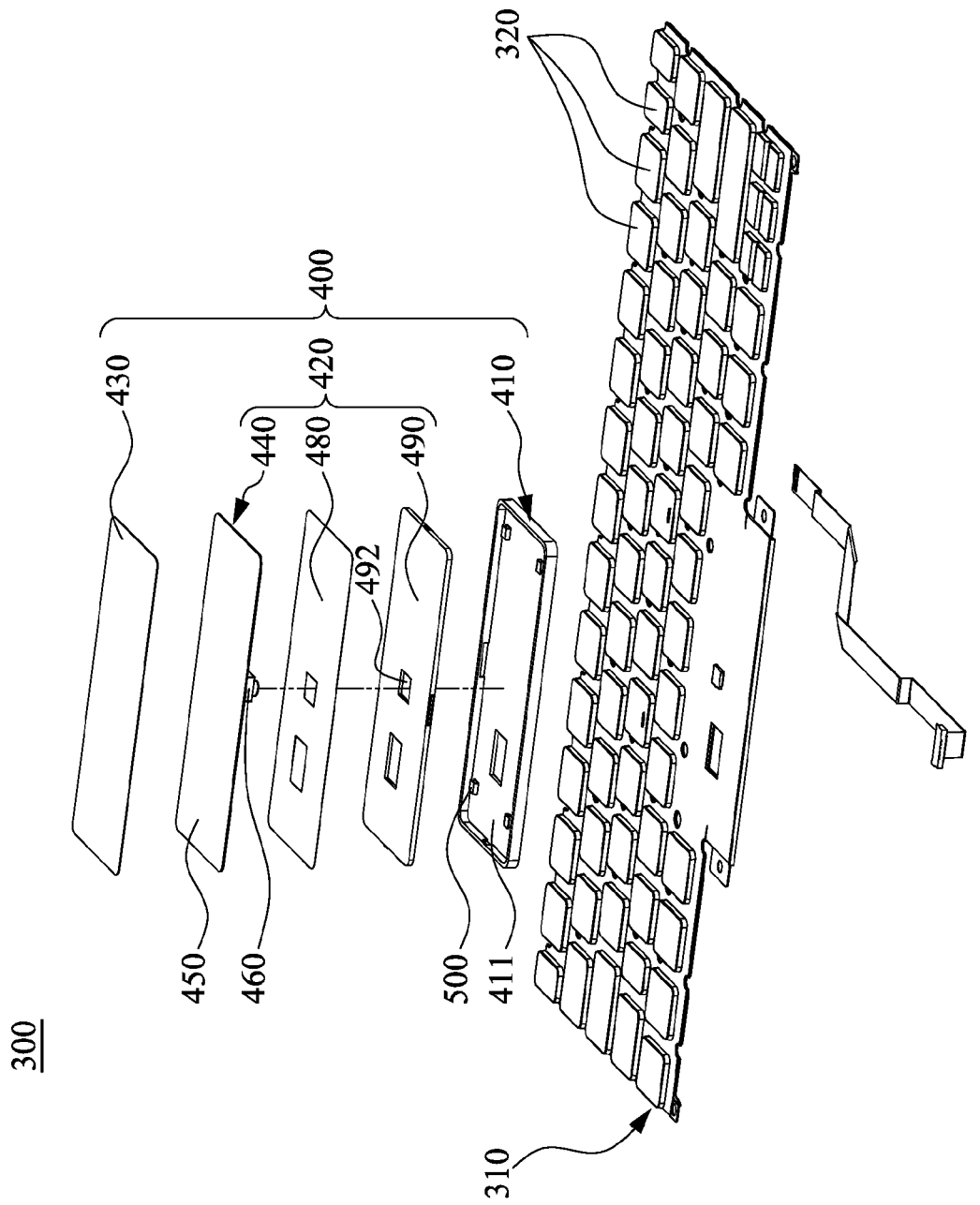
FIG. 2 is an exploded view showing the keyboard of the portable computer according to this embodiment of the present disclosure.

Reference is now made to FIG. 1 and FIG. 2, in which FIG. 1 is a schematic view showing an unfolded status of the portable computer 100 according to one embodiment of the present disclosure; and FIG. 2 is an exploded view showing the keyboard 300 of the portable computer 100 according to this embodiment of the present disclosure.

The portable computer 100 is e.g., a tablet computer or a notebook computer, and includes a lower member 102 and an upper member 101. The upper member 101 is moveably disposed on the lower member 102 so as to allow the upper member 101 to cover the lower member 102 or stand on the lower member 102.

According to this embodiment, the portable computer 100 is e.g., a slide-cover computer, and the portable computer 100 includes a computer body 200 and a keyboard 300. The keyboard 300 is disposed on the lower member 102. The computer body 200 is not limited to be disposed in the lower member 102 or in the upper member 101. The keyboard 300 is e.g., a QWERTY keyboard, and includes a support frame 310, a plurality of keys 320 and a space bar 400. The keys 320 and the space bar 400 are disposed on the support frame 310 and arranged with intervals, and supported by the support frame 310. A part of the space bar 400 is directly disposed between two of the keys 320, and the other part of the space bar 400 is protruded from the keys 320, on the other words, the top area of the space bar 400 is larger than the top area of any of the key 320. When any of the keys 320 is clicked on the support frame 310, the key 320 is actuated to generate (i.e., send) a corresponding key code to the computer body 200.

Reference is now made to FIG. 3 and FIG. 4, in which FIG. 3 is a cross sectional view taken alone A-A showing the space bar 400 shown in FIG. 1 not being clicked; and FIG. 4 is a cross sectional view taken alone A-A showing the space bar 400 shown in FIG. 1 being clicked.

As shown in FIG. 3 and FIG. 4, the space bar 400 includes a base frame 410, a touch pad 420 and a plurality of (e.g., four) elastic elements 500. The base frame 410 is fastened on the support frame 310 and formed with an accommodation space 411. The touch pad 420 is reciprocatably and elevatably disposed in the accommodation space 411 of the base frame 410, thus, the touch pad 420 can be reciprocated upwardly or downwardly therein, i.e., the touch pad 420 is able to linearly ascend or descend in the accommodation space 411 of the base frame 410. The elastic elements 500, e.g., elastic caps, elastic pieces or springs, are symmetrically disposed between the base frame 410 and touch pad 420 and spaced with intervals, and elastically support the touch pad 420, so when the touch pad 420 is no longer be pressed, the elastic elements 500 pushes the touch pad 420 to linearly recover to the surface of the base frame 410 (i.e., the top surface of the space bar 400). With the reaction force provided by the elastic elements 500, the space bar 400 is equipped with the clicking and recovering effects substantially the same as the mentioned keys 320.

The touch pad 420 is formed with a first surface 421 and a second surface 422 opposite to the first surface 421. The first surface 421 of the touch pad 420 allows a user to touch for controlling a cursor to be displaced. When the first surface 421 of the touch pad 420 is touched, a cursor displacing signal is generated with respect to the location where the first surface 421 of the touch pad 420 is touched. The second surface 422 of the touch pad 420 is in contact with the elastic elements 500, and further installed with one or more first key switches 460.

As shown in FIG. 2 and FIG. 3, the touch pad 420 further includes a protective film 430, a circuit board 440 and a circuit board supporter 490. The top surface of the circuit board 440 is corresponding to the first surface 421, and a touch sensing electrode 450 is provided on the top surface of the circuit board 440, and the protective film 430 is provided on the touch sensing electrode 450. The first key switch 460 is welded on the bottom surface of the circuit board 440, and the bottom surface of the circuit board 440 is corresponding to the second surface 422 of the touch pad 420, and adhered on the circuit board supporter 490 through an adhesive layer 480. The circuit board supporter 490 includes a fasten part 491 and at least an opening 492. The fasten part 491 is arranged at the outer edge of the circuit board supporter 490. The circuit board supporter 490 is disposed in the accommodation space 411, and positioned in the accommodation space 411 of the base frame 410 through the fasten part 491 so as to prevent from releasing from the accommodation space 411. The first key switch 460 is protruded from the circuit board supporter 490 through the opening 492 of the circuit board supporter 490.

Accordingly, as shown in FIG. 2 and FIG. 4, when the space bar 400 shown in FIG. 2 is pressed downwardly by the user, i.e., the first surface 421 of the touch pad 420 is pressed downwardly by the user, and the touch pad 420 is pressed downwardly to the bottom surface of the base frame 410 in the accommodation space 411, the first key switch 460 of the second surface 422 of the touch pad 420 is pressed and triggered by the base frame 410. At this moment, the first key switch 460 generates (i.e., send) a corresponding key code towards the computer body 200.

Figure 5:
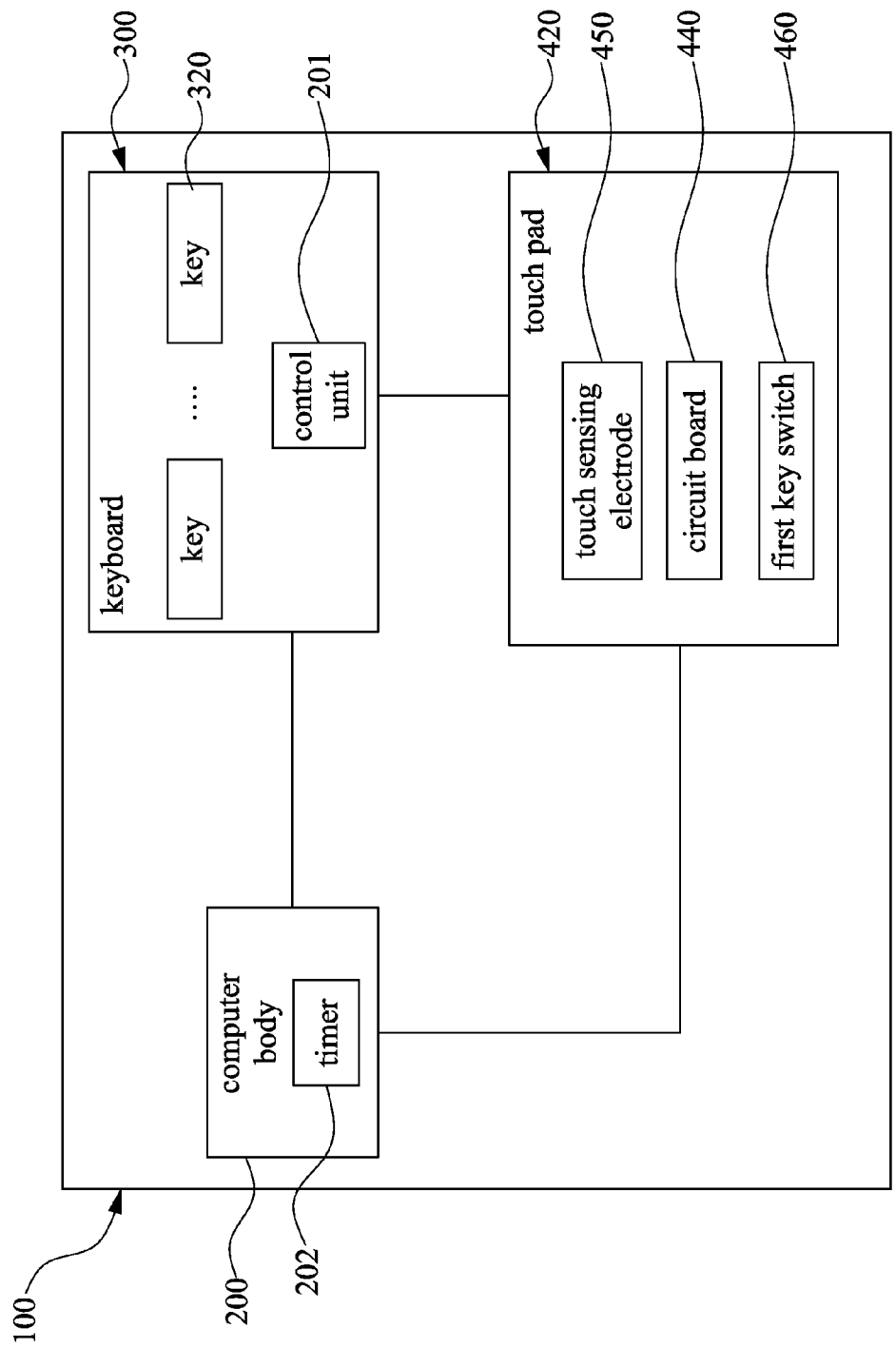
FIG. 5 is a block diagram illustrating the portable computer according to the present disclosure.

FIG. 5 is a block diagram illustrating the portable computer 100 according to the present disclosure. According to this embodiment and as shown in FIG. 2 and FIG. 5, the computer body 200 includes a control unit 201 and a timer 202. The timer 202 notifies the computer body 200 after a certain period of time is exceeded. The control unit 201 is connected to the computer body 200, the keyboard 300 and the touch pad 420.

For example, the control unit 201 can be a single control chip. The single control chip can be disposed in the keyboard 300 and electrically connected to the first key switch 460 and the touch pad 420. The single control chip is provided with advantages such as simplifying circuit design, reducing occupied space and lowering the production cost. However, the single control chip is only adopted for illustration and shall not be seen as a limit to the scope of the present disclosure.

Figure 6:
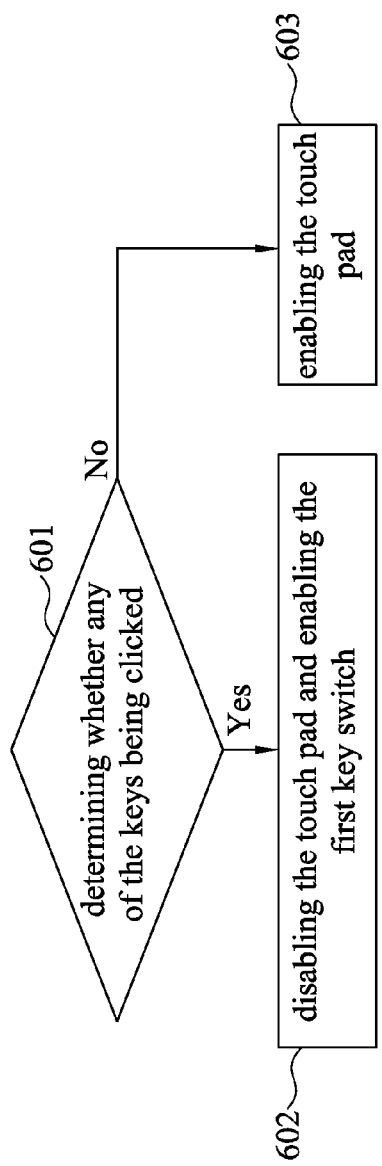
FIG. 6 is a flow chart illustrating the computer body of the portable computer determining whether entering a keyboard mode or a touch pad mode according to this embodiment of the present disclosure.

Reference is now made to FIG. 6, which is a flow chart illustrating the computer body 200 of the portable computer 100 determining whether entering a keyboard mode or a touch pad mode according to this embodiment of the present disclosure.

As shown in FIG. 6, the control unit 201 of the computer body 200 determines whether entering a keyboard mode or a touch pad mode according to the steps as outlined below.

In STEP (601), determining whether any of the keys 320 is clicked; if any of the keys 320 is clicked, then process STEP (602), otherwise, if none of the keys 320 is clicked, then process STEP (603). In the STEP (602), disabling the touch pad 420 and enabling the first key switch 460. In the STEP (603), if none of the keys 320 is clicked within the certain period of time, enabling the touch pad 420.

According to one alternative of this embodiment, in the STEP (601) and the STEP (602), because the keyboard 300 is detected in use, the computer body 200 enters a keyboard mode, so the touch pad 420 temporally stops the control of the cursor and provides an input function to the space bar 400. Thus, at this moment, when the computer body 200 enters the keyboard mode and the touch pad 420 is pressed downwardly to press and trigger the first key switch 460, the control unit 201 of the computer body 200 enables the first key switch 460 to generate (i.e., send) a key code (e.g., key code 32) corresponding to a spacebar of a regular keyboard towards the computer body 200.

Substantially, when all of the keys 320 are not clicked within the certain period of time (e.g., 1 to 3 seconds), the computer body 200 enters the touch pad mode, the control unit 201 of the computer body 200 enables the touch pad 420 to work. Thus, when the computer body 200 enters the touch pad mode, the control unit 201 of the computer body 200 allows the touch pad 420 to recover the control to the cursor.

Moreover, according to another alternative of this embodiment, in the STEP (603), when the computer body 200 enters the touch pad mode, the computer body 200 further disables the first key switch 460 to stop working, so the first key would not generate (i.e., send) a key code to the computer body 200 regardless the touch pad 420 being pressed to press and trigger the first key switch 460.

Moreover, according one another alternative of this embodiment, the first surface 421 of the touch pad 420 is divided into a first portion 421A and a second portion 421B which are left/right symmetrically arranged abreast. When then computer body 200 enters the touch pad mode, the computer body 200 does not disable the first key switch 460, so the first key switch 460 is kept to be enabled, when the touch pad 420 is pressed downwardly to press and trigger the first key switch 460, the control unit 201 of the computer body 200 allows the first key switch 460 to generate (i.e., send) a key code corresponding to a regular left mouse key or right mouse key of a regular mouse device with respect to the situation of the first portion 421A or the second portion 421B of the first surface 421 of the touch pad 420 being touched, in other words, when the user presses the touch pad 420 downwardly to press and trigger the first key switch 460 by touching the first portion 421A of the first surface 421 of the touch pad 420, the control unit 201 of the computer body 200 generates (i.e., send) the key code of the left mouse key towards the computer body 200; on other hand, when the user presses the touch pad 420 downwardly to press and trigger the first key switch 460 by touching the second portion 421B of the first surface 421 of the touch pad 420, the control unit 201 of the computer body 200 generates (i.e., send) the key code of the right mouse key to the computer body 200.

Figure 7:
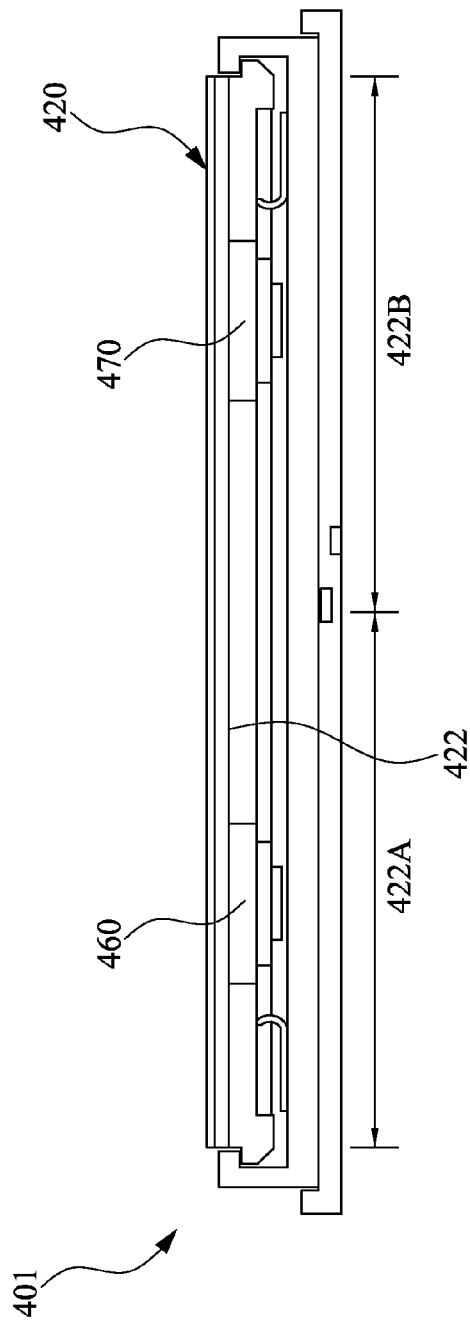
FIG. 7 is a cross sectional view showing the space bar of the keyboard of the portable computer according to another embodiment of the present disclosure.

FIG. 7 is a cross sectional view showing the space bar 400 of the keyboard 300 of the portable computer 100 according to another embodiment of the present disclosure. As shown in FIG. 5 and FIG. 7, the different between this embodiment and the previous embodiment is that the space bar 401 further includes a second key switch 470. The second surface 422 of the touch pad 420 is divided into a third portion 422A and a fourth portion 422B which are left/right symmetrically arranged abreast. The first key switch 460 is disposed on the third portion 422A of the second surface 422. The second key switch 470 is disposed on the fourth portion 422B of the second surface 422.

Because anyone of the keys 320 is clicked, the computer body 200 enters a keyboard mode, so the touch pad 420 temporally stops the control of the cursor and provides an input function to the space bar 401. Thus, at this moment, when the touch pad 420 is pressed downwardly to press and trigger the first key switch 460, the second key switch 470 or both of the first key switch 460 and the second key switch 470, the triggered one of the first key switch 460, the second key switch 470 or both of the first key switch 460 and the second key switch 470 generate (i.e., send) a key code (e.g., key code 32) corresponding to a spacebar of a regular keyboard towards the computer body 200.

When the computer body 200 enters the touch pad mode, the computer body 200 does not disable the first key switch 460 and the second key switch 470, and keeps to enable the first key switch 460 and the second key switch 470 instead. Thus, when the touch pad 420 is pressed downwardly to press and trigger the first key switch 460, the control unit 201 of the computer body 200 generates (i.e., send) a key code corresponding to the left mouse key; when the touch pad 420 is pressed downwardly to press and trigger the second key switch 470, the control unit 201 of the computer body 200 generates (i.e., send) a key code corresponding to the right mouse key.

Based on what has been disclosed above, the portable computer provided by the present disclosure integrates the touch pad and the space bar as one, the operation surface where the keyboard of the portable computer being disposed is larger, so the operation surface can be relatively reduced or other components are allowed to be installed due to be the saved space, so the time required for learning a new operation technique for the user can be decreased.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable computer comprising:
   a computer body comprising a control unit, and a timer for notifying the computer body after a certain period of time is exceeded; and
   a keyboard electrically connected to the computer body, and comprising:
      a plurality of keys exposed outwardly from a surface of the keyboard; and a space bar exposed outwardly from the surface of the keyboard, and the space bar comprising:
         a base frame; a touch pad linearly and elevatably disposed on the base frame thereon, electrically connected to the control unit, and the touch pad comprising a first surface and a second surface opposite to the first surface thereof, and the touch pad generating a cursor displacing signal corresponding to the location where the first surface is touched;
         at least one elastic element disposed between the base frame and the second surface of the touch pad, and elastically supporting the touch pad; and
         a first key switch disposed on the second surface of the touch pad,
   wherein when at least one of the keys is clicked, the control unit disables the touch pad and enables the first key switch,
   when anyone of the keys is not clicked within the certain period of time, the control unit enables the touch pad.

2. The portable computer according to claim 1, wherein when the touch pad is pressed downwardly to trigger the first key switch, the first key switch generates a key code of the space bar of the keyboard.

3. The portable computer according to claim 1, wherein when anyone of the keys is not clicked within the certain period of time, the computer body further disables the first key switch.

4. The portable computer according to claim 1, wherein the first surface of the touch pad is divided into a first portion and a second portion which are symmetrically arranged abreast,
   wherein when the touch pad is enabled, and after the touch pad is pressed downwardly to trigger the first key switch, the control unit enables the first key switch to generate a key code of a left mouse key or a right mouse key with respect to the first portion or the second portion of the first surface of the touch pad being touched.

5. The portable computer according to claim 1, wherein the second surface of the touch pad is divided into a third portion and a fourth portion which are symmetrically arranged abreast, and the first key switch is disposed on the third portion of the second surface; and
   the space bar further comprises a second key switch disposed on the fourth portion of the second surface,
   when the touch pad is pressed downwardly to trigger at least one of the first key switch and the second key switch, the at least one of the first key switch and the second key switch generates a key code of the space bar of the keyboard.

6. The portable computer according to claim 5, wherein when anyone of the keys is not clicked within the certain period of time, the control unit enables the touch pad, and the control unit enables the first key switch to generate a key code of a left mouse key after being triggered, and the second key switch to generate a key code of a right mouse key after being triggered.

7. The portable computer according to claim 1, wherein the keyboard further comprises:
   a support frame for supporting the keys and the space bar.

8. The portable computer according to claim 1, wherein the space bar further comprises:
   a protective film covered on the first surface of the touch pad.

9. The portable computer according to claim 1, wherein the computer body further comprises:
   a single control chip disposed in the keyboard and electrically connected to the first key switch and the touch pad.

* * * * *